Dec. 25, 1956   R. F. SMITH   2,775,318
HYDRODYNAMIC BRAKE
Filed June 11, 1952   3 Sheets-Sheet 1
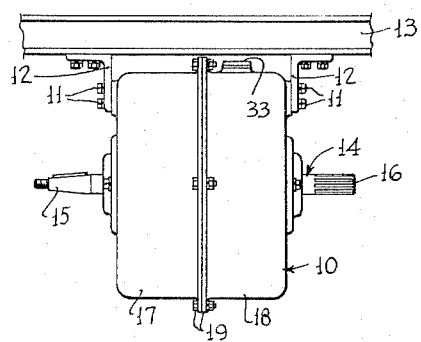
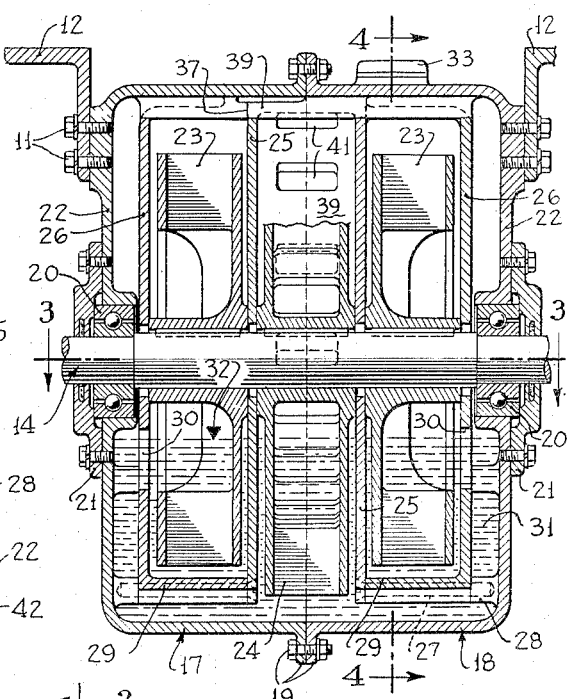
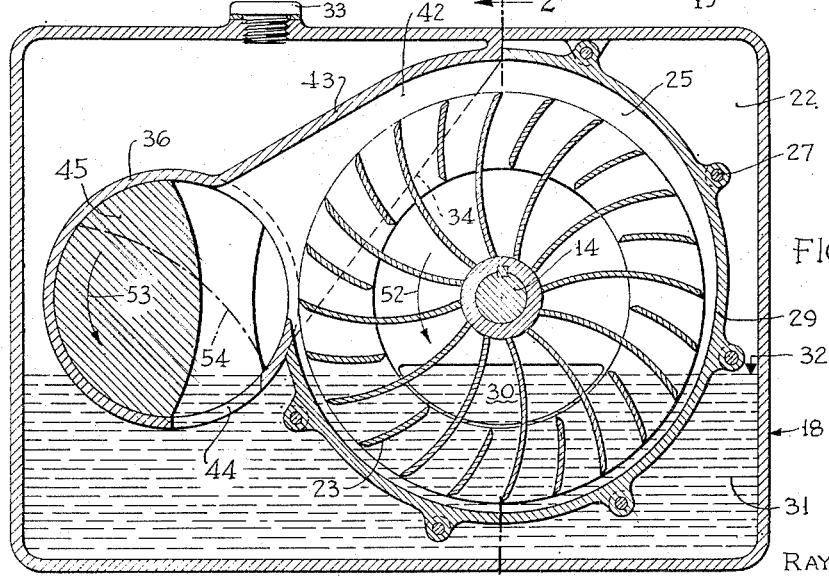
INVENTOR
RAY F. SMITH
BY Karl L. Schiff
HIS AGENT Dec. 25, 1956     R. F. SMITH     2,775,318

HYDRODYNAMIC BRAKE

Filed June 11, 1952     3 Sheets-Sheet 2

INVENTOR
RAY F. SMITH
BY *Karl L. Schiff*
HIS AGENT

Dec. 25, 1956          R. F. SMITH           2,775,318
                    HYDRODYNAMIC BRAKE

Filed June 11, 1952                    3 Sheets-Sheet 3

INVENTOR
RAY F. SMITH
BY Karl L. Schiff
AGENT

United States Patent Office 2,775,318
Patented Dec. 25, 1956

2,775,318

HYDRODYNAMIC BRAKE

Ray F. Smith, York, Pa.

Application June 11, 1952, Serial No. 293,017

11 Claims. (Cl. 188—90)

The invention relates to a hydro-dynamic speed retarder particularly for motor vehicles, and still more particularly for heavy vehicles such as trucks and busses.

Among the objects of the invention is a speed retarder of the indicated type which is of simple, rugged construction, which is durable and efficient over long periods of time, which has very few moving parts, which is free of delicate valves, which automatically adjusts its retarding effect to the speed of the vehicle, which applies the retarding effect gradually without sudden jerks or jars, which can easily be installed in existing vehicles, which allows adjustment of the retarding force, and which requires no servicing whatever over long periods of time, which is of small, compact size, which is foolproof, and which is in its effectiveness not at all or only little influenced by high or freezing temperatures.

The aforesaid and other objects and advantages are achieved by the provision of hydraulic pump means such as a hydraulic pressure generator, impeller, or pump in combination with a hydraulic motor, vaned rotor or turbine communicating with the delivery side of the pump, both the pump and the vane wheel being connected with the driving mechanism so that, when in action, they present an obstruction to the rotation of the driving mechanism.

In a preferred form of the invention two impellers or the like flank one vane or the like and all three are mounted on one shaft in a common housing partly filled with liquid.

The objects, advantages, and features of the invention will be more fully and more clearly understood from the illustration of one embodiment in the attached drawing and from the following description thereof.

In the drawing:

Fig. 1 is a small scale side elevation of the new speed retarder and of adjoining parts of the chassis frame to which the retarder is attached;

Fig. 2 is, on a larger scale, a vertical section through the retarder substantially along lines 2—2 of Figs. 3 and 4;

Figs. 4 and 5 are transverse vertical sections along the correspondingly numbered lines of Figs. 2 and 3, respectively;

Fig. 6 is a fragmentary section along line 6—6 of Fig. 5; and

Figure 7:
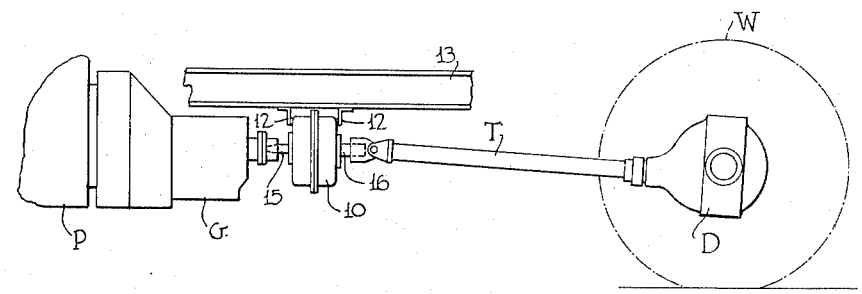
Fig. 7 is a fragmentary diagrammatic side elevation of the new retarder and of the transmission between motor and rear wheels of a motor vehicle, the scale being still smaller than that of Fig. 1.

The speed retarder comprises an outer case or box designated as a whole by the numeral 10, which is removably secured by bolts 11 to cross beams 12 interconnecting side sills 13 of a vehicle such as a bus or truck. A shaft 14 extending through case 10 has a driven end 15 adapted for connection with the driving shaft of the power unit P of the vehicle and a driving end 16 adapted for connection with the drive or transmission shaft T leading to the differential D and wheels W. Unit 10 preferably takes the place of the mid-ship bearing or center bearing of the drive shaft. Housing 10 might be flanged directly to or form part of the gear box G. The general arrangement of the retarder is diagrammatically shown in Figs. 1 and 7.

The outer case consists of two main parts 17, 18 secured together by flanges and bolts 19 along a plane extending transversely to shaft 14. Roller bearings 20 held by oil-seal retainers 21 rotatably support shaft 14 in walls 22 of the case.

Two impeller wheels 23 and between them a vane wheel 24 are keyed to shaft 14. Impellers 23 are separated from vane 24 by partitions 25 and from walls 22 by partitions 26. Each pair of partitions 25, 26 is secured by bolts 27 to one of the case halves 17, 18, respectively. The bolts 27 extend through ears in the different members and into threaded projections 28 of the respective case halves.

The space between the partitions 25, 26 of each pair is bridged by a circumferential partition 29 formed in one piece with the respective partition 26. Partitions 26 have an opening 30 near to shaft 14 for the admittance of liquid 31 filled to level 32 into case 10 through an opening closed by removable plug 33. The partitions 25, 26 terminate on one side in straight margins 34 free of circumferential partition 29 and adjoin formations of the case 10, to be described in the following.

Formed on case halves 17, 18 are the two parts 35, 36 of a part-circular valve housing. The two parts 35, 36 meet each other along line 37 which is in about one plane with the outer surface of one of the partition walls 25.

The mid-portion of the housing, that is: the inner region of part 36, is provided with transverse wall portions 38 interconnected by circumferential wall portions 39, 40. Wall portion 39 is concentric to shaft 14 and is provided with liquid jets in the form of slots or holes 41, forming with vane 24 parts of an impulse turbine. The wall portions 38 to 40 form together a circumferential chamber of gradually diminishing cross section.

The wall portions 38 adjoin and form continuations of the inner partition walls 25, whereas the outer partitions 26 and the circumferential partitions 29 adjoin by their margins 34 partition extensions 42, 43 formed on the housing halves 35, 36.

Housing 35, 36 is provided in line with impellers 23 with openings 44 communicating with the interior of case 17, 18.

Figure 3:
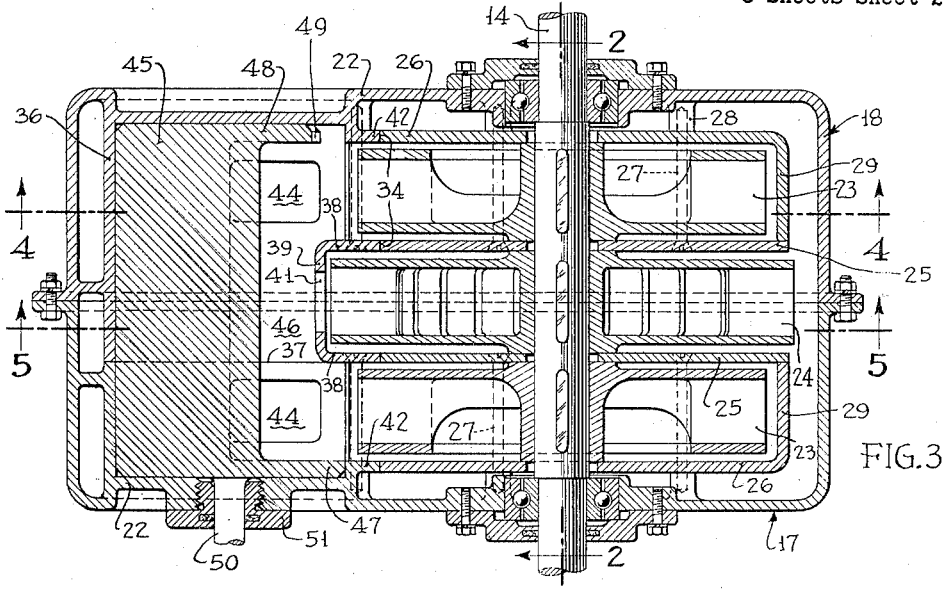
Fig. 3 is a horizontal section along lines 3—3 of Figs. 2 and 5.
Figure 5:
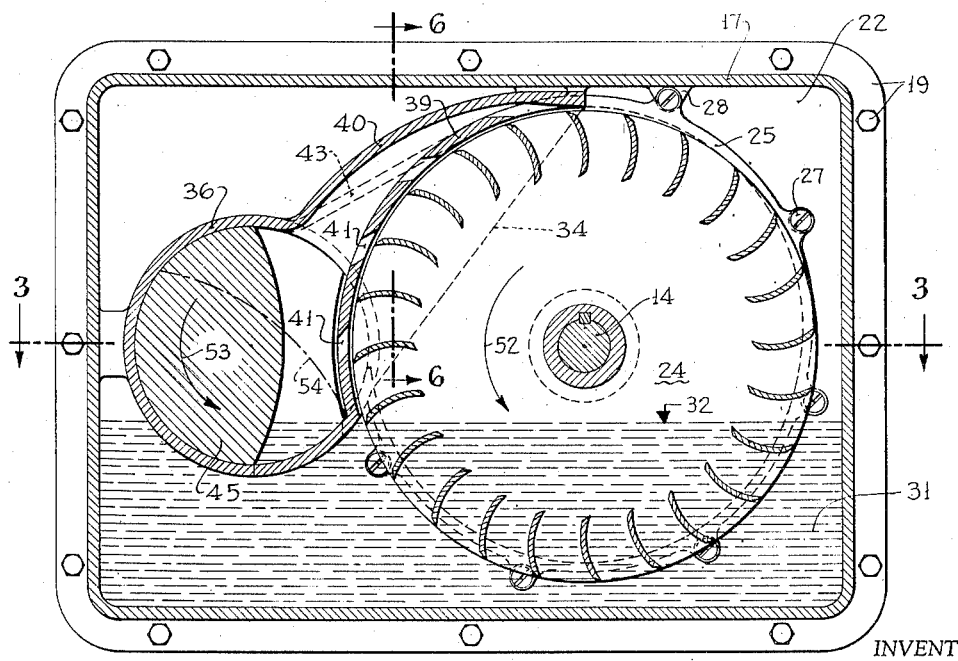

A valve body 45 is supported in casing 35, 36. The body is basically of circular cross section but is recessed between its ends as shown in Figs. 3 to 5, providing an open chamber 46 in the casing. End portion or disc 47 of the valve body is full circular whereas the other end disc 48 has a convex cut-out 49 permitting disc 48 to pass over projecting wall portion 39 for assembly purposes.

A stub shaft 50, formed on one end of and being concentric with valve body 45, extends through the one case wall 22 and a liquid seal 51 thereon. Shaft 50 is connected by any appropriate means such as a flexible cable (not shown) with an operating device on the instrument panel of the vehicle.

In the position of valve body 45 illustrated in full lines, Figs. 3 to 5, the pump housings 25, 26, 29 surrounding impellers 23 are in open communication through the openings 44 with the interior of case 17, 18 so that, upon rotation of shaft 14 and its wheels 23, 24 in the direction of arrow 52, liquid entering through openings 30 will merely be discharged through openings 44 and moved around by the impellers without offering substantial resistance.

When, however, valve body 45 is turned in direction of arrow 53 to the position indicated in Figs. 4 and 5 by dot-and-dash lines 54, the openings 44 are closed so that fluid pressure will be built up in valve chamber 46, the liquid will escape through jets 41 and will be thrown against vane 24, trying to retard the latter's rotation. In this case, resistance against rotation is created by the pumping action of the impellers 23 as well as by the impingement of the pressure liquid against vane 24, so that the speed of the vehicle is retarded until an equilibrium has been reached.

Intermediate positions of valve body 45 permit adjustment of the retarding effect of the new device and thereby selection of a desired vehicle speed if the latter should, for instance, travel on a long downward grade.

The entire liquid is carried in the case itself. The liquid preferably consists of a mixture of glycerine and liquid graphite. The advantage of glycerine is that it is non-freezing and non-evaporating, and the liquid graphite serves to dissipate the heat and hold down friction.

The size of the retarder for a 15-ton truck may be about 18x14x14 inches.

The illustrated unit, when put in full operation, is designed so that it will reduce the speed of a vehicle traveling at high speed to less than half.

The chamber space presents an air cushion which together with slippage between fluid and impellers and vane prevents application of a shock load; indeed, the retarding load applied by the new device is many times easier than the driving load applied in forward direction by motor and clutch action.

On icy roads or slippery pavements, it is impossible to slide the wheels or to bring the vehicle speed to less than approximately 15 miles per hour by the action of the retarder alone. Upon reduction of the RPMs, the impellers will correspondingly reduce the liquid pressure in the valve chamber and on the vane, and will correspondingly reduce the retarding effect on the shaft.

It is estimated that the retarder will under ordinary conditions function without any service whatever for a minimum of 100,000 miles, at which time it may be replaced as a unit. However, such replacement would be a mere precautionary measure, inasmuch as the retarder, due to its simple, sturdy construction, should still be fully operative after 300,000 miles or more, at which point it might be advisable to renew the oil seals.

The new retarder is foolproof inasmuch as it can be applied at any speed and will gently exert its retarding effect without sudden jar and without undue stress or strain.

Regardless of who operates the retarder or how inexperienced the operator may be, the only thing that can be done with the retarder is to retard the speed of the vehicle. Should the retarder be applied and the operator forget to release it, it will retard the speed of the vehicle when power is applied by the motor to the speed at which the unit is set.

Inasmuch as there are no rubbing parts, and in view of the liquid used, the heat may rise up to 200° F. before the retarder might become inoperative. As soon as the temperature drops back to approximately 150° F., the retarder will regain its full efficiency without ill effects to liquid or parts of the unit.

With the indicated type of liquid, the unit will retain its efficiency down to approximately 40° F. below zero. At such extremely low temperature, the liquid will become heavy and noticeable extra power will be required even in the off-position of the valve for moving the liquid around in the casing by the impellers. The only change required at sub-freezing temperatures would be the addition of greater amounts of graphite, which is non-corroding and non-solidifying. For instance, three times the amount of graphite ordinarily indicated is considered appropriate under such conditions.

The invention is not restricted to the details of the illustrated embodiment but modifications, and adaptations to special conditions will easily occur to those skilled in the art without departing from its basic concept.

What is claimed is:

1. Retarder especially for motor vehicles comprising: a case for liquid, a liquid pump means communicating on its intake side with the lower part of said case, a vaned rotor, a liquid conduit between the delivery side of said pump means and the intake side of said rotor, a liquid conduit between the discharge side of said rotor and the interior of said case so as to return liquid leaving the rotor to the intake side of said pump means, the moving parts of said pump means and rotor being designed for connection to a transmission such as a transmission leading to wheels of a vehicle so that liquid circulated by the pump means through the rotor exerts a retarding effect on said transmission.

2. Retarder according to claim 1 comprising: manually adjustable 3-way valve means in the conduit between said pump means and rotor and in the conduit between the delivery side of the pump means and the case, said valve means directing in one position liquid circulated by the pump means without substantial retarding effect back to the case in bypassing the rotor and directing in another position the liquid from the pump means through the rotor.

3. Retarder according to claim 1, said pump means being in the form of a centrifugal pump.

4. Retarder according to claim 1, said rotor being an impulse turbine.

5. Retarder according to claim 1, said pump means being a centrifugal pump and said rotor an impulse turbine.

6. Retarder according to claim 1, said pump means and rotor being secured on a common shaft.

7. Retarder according to claim 1, one of said pump means and rotor consisting of two units embracing the other one of said rotor and pump means.

8. Retarder according to claim 1, the pump means comprising two centrifugal pumps and the rotor in the form of an impulse turbine being secured to a common shaft, said turbine being arranged between and flanked by said pumps.

9. Retarder according to claim 1, pump means and rotor both being arranged in and enclosed by said case.

10. Retarder according to claim 1, comprising a valve with a cylindrical valve body supported rotatably about its axis in a generally cylindrical housing, said housing having an opening for communication between the delivery side of the rotor and the interior of the case in one position of the valve body, said housing having jets leading from the interior of the housing to said rotor for the discharge of pressure liquid generated in another position of the valve body by shutting off the interior of said valve housing from the case.

11. Retarder according to claim 1, comprising a valve with a valve body supported rotatably about its axis in a generally cylindrical housing and formed and arranged for connecting the delivery side of said pump means alternately with said case and the intake of said rotor, said valve being arranged together with said rotor and pump means in the interior of said case.

References Cited in the file of this patent

UNITED STATES PATENTS

| | | |
|---|---|---|
| 1,569,543 | Hem | Jan. 12, 1926 |
| 2,014,684 | Junkers | Sept. 17, 1935 |
| 2,388,112 | Black et al. | Oct. 30, 1945 |
| 2,496,497 | Russell | Feb. 7, 1950 |
| 2,498,572 | O'Leary | Feb. 21, 1950 |
| 2,548,299 | Frankenstein | Apr. 10, 1951 |
| 2,670,815 | Wilson | Mar. 2, 1954 |

FOREIGN PATENTS

| | | |
|---|---|---|
| 466,411 | Great Britain | May 24, 1937 |